3,652,492
PROCESS FOR PRODUCTION OF HIGH MOLECULAR SUBSTANCE HAVING OPTICAL SPECIFICITY
Hiroyoshi Kamogawa, Kawasaki-shi, and Masao Kato, Yokohama, Japan, assignors to Agency of Industrial Science & Technology, Tokyo, Japan
No Drawing. Filed Feb. 8, 1968, Ser. No. 703,898
Int. Cl. C08f 45/14
U.S. Cl. 260—41                           3 Claims

ABSTRACT OF THE DISCLOSURE

A process for the production of a phototropic high molecular weight polymer comprising reacting thionine with an N-hydroxymethyl group of a polymer of an N-hydroxymethyl(meth)acrylamide in a dehydrative condensation reaction to join said thionine to said polymer.

BACKGROUND OF THE INVENTION

This invention relates to a process for the production of a high molecular substance having optical specificity.

Heretofore, substances which, when irradiated with light energy of visible light, ultraviolet light, etc., exhibit specific optical properties such as phototropy, fluorescence, ultraviolet absorption, etc. have been known in large numbers, and these substances have been utilized even as industrial materials. However, little is known as to high molecular substances having an organic component which has the above said optical properties in a side chain of the molecule chain.

A high molecular substance of an organic compound which exhibits the above-mentioned optical properties is extremely superior in uniformity of distribution, transparency and solvent resistance in a solid state as compared with conventional high molecular substances in which a low molecular compound is mixed. Particularly, a film formed of a high molecular substance, when heat-treated, becomes insoluble because the methylol group remaining in said substance causes a condensation-cross linking reaction. Accordingly, even a film of a water-soluble high molecular substance can readily be insolubilized by heat treatment.

The object of this invention is to provide a process of producing a high molecular substance having optical specificity easily in high yields.

SUMMARY OF THE INVENTION

In the process of this invention, it is aimed, by utilizing the reaction of the hydroxymethyl (methylol) group —CH$_2$OH of the N - hydroxymethyl(meth)acrylamide component in the molecule of a straight-chain high molecular substance, to chemically combine with said high molecular substance an organic compound which contains an amino group, a hydroxyl group, etc. having active hydrogen and which exhibits optical specificity, thereby producing a high molecular substance having optical specificity.

The high molecular substance used in this invention is preferably a polymer of an N-hydroxymethyl(meth) acrylamide alone or a copolymer of an N-hydroxymethyl (meth)acrylamide with at least one monomer selected from an (meth)acrylamide, (meth)acrylic ester, (meth) acrylic acid, (meth)acrylic salt, styrene and vinyl acetate which improve the properties such as solubility, film-forming ability, etc. of the resulting high molecular substance. Also, a high molecular substance having the (meth)acrylamide component therein converted to methylol with formaldehyde is likewise usable.

On the other hand, suitable as the compound having optical specificity which reacts with the methylol group of the above said high molecular substance is an azo compound containing a primary or secondary amino group having active hydrogen such as 4-aminoazobenzene, 4-dimethylamino-4'-(p-aminophenyl), or the like and which exhibits phototropy, a phenothiazine-type compound containing an amino group having active hydrogen such as thionine, phenothiazine, or the like, or a fluorescent substance containing an alcoholic hydroxyl group such as riboflavin derivative.

The reaction is a dehydrative condensation reaction of the methylol group of a high molecular substance with the active hydrogen of a compound having optical specificity, as shown below:

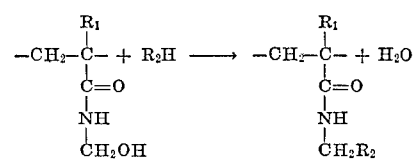

Wherein R$_1$ is H or CH$_3$, and R$_2$H is a compound containing a primary or secondary amino group, a hydroxyl group, etc. having active hydrogen and which exhibits optical specificity.

The above reaction is carried out by heating the aqueous or organic solution in which a high molecular substance having a methylol group and a compound having optical specificity are dissolved, as it is or after it is acidified by the addition of a small amount of an acidic substance such as hydrochloric acid, para-toluene-sulfonic acid, or the like.

Further, in the process of this invention, as the compound having optical specificity, use may be made of a benzophenone derivative containing a phenolic hydroxyl group, or a coumarin-type ultraviolet absorber containing a phenol nucleus such as umbelliferone, esculin, or the like. Also, a phenolic azobenzene compound, too, which exhibits phototropy such as 4-hydroxyazobenzene is usable.

DESCRIPTION OF PREFERRED EMBODIMENTS

The following examples are further illustrative of this invention, and it will be understood that the invention is not limited thereto.

Example 1

2.5 parts of N-hydroxymethyl acrylamide, 5 parts of butyl acrylate, 5 parts of methyl methacrylate, 0.15 parts of benzoyl peroxide and 0.1 part of dodecyl mercaptan were dissolved in 30 parts of tetrahydofuran, and polymerized for 5 hours at 70° C. in a sealed tube under reduced pressure. The resulting solution of high viscosity was diluted with tetrahydrofuran to a concentration of 10%, followed by the addition of an excess (7 parts) of 4-aminoazobenzene, and the mixture was refluxed under heating for 15 hours. The resulting solution of deep orange color was precipitated in water, and the precipitate was dissolved in tetrahydrofuran and reprecipitated in water. This operation was repeated several times to obtain a purified mass of orange color, which mass was soluble in alcohol, tetrahydrofuran, benzene, etc. A transparent film of yellow color was prepared from said mass and analyzed for nitrogen, with the result that the rate of reaction was found to be 61.4% to the methylol group of the starting high molecular substance.

This high molecular substance, when irradiated with visible light from a tungsten lamp, etc., exhibited the "phototropy" phenomenon is a solution of benzene, etc. and even in a film state; for example, in the benzene solution, the maximum absorption at 381 m$\mu$ before irradiation quickly moved to a lower wavelength region as the irradiation proceeded, and the specific extinction coefficient at 381 m$\mu$ was reduced from 6.76 to 4.32 by the irridiation from, for example, a 100 w. tungsten lamp, but, upon the irradiation being stopped, quickly returned to its original state.

Example 2

0.4 part of thioine (excess) and 5 parts of water were added to 10 parts of an aqueous solution of 5% N-hydroxymethyl acrylamide-acrylamide copolymer (1:5 weight ratio), and the mixture was heated for 5 hours at 90° C. The resulting solution of deep purple color was precipitated in ethanol, and the precipitate was dissolved in water and reprecipitated in alcohol. This operation was repeated several times to purify the high molecular substance. This purified high molecular substance was freeze-dried from the aqueous solution to obtain a bulky high molecular substance of purple color.

As a result of the reduction-titration with titanium trichloride, this reaction was found to be quantitative to the methylol group.

This high molecular substance, because of the presence of an appropriate reducing material, for example, in a bath solution, $Fe^{++}$ ion, or, in a film state, polyvinyl alcohol, exhibited the same phototropy phenomenon as in Example 1; for example, in an acidic solution of phosphoric acid, the absorption (blue color) having the maximum at 603 m$\mu$ was reduced very quickly and strongly by the irradiation of visible light, but, upon the irradiation being stopped, quickly returned to its original state.

For example, in one instance, the specific extinction coefficient was reduced from 150 to 19 (irradiation from a 100 w. tungsten lamp, 0.1 mol./l. phosphoric acid solution, high molar concentration 10 mg./l., ferrous ammonium sulfate $1.8 \times 10^{-3}$ mol./l.).

Example 3

An excess of paraformaldehyde was added to an aqueous solution of 5% polyacrylamide slightly acidified with a small amount of caustic alkali, and the mixture was stirred for 1 hour at room temperature, with the result that the paraform was gradually dissolved to give a transparent solution. The resulting solution was precipitated in a large amount of acetone, and the precipitate was dissolved in water and reprecipitated into acetone. This operation was repeated twice to obtain a purified methylol compound. The methylol compound thus obtained was dissolved in water, followed by the addition of an excess of riboflavin-5'-sodium phosphate, then the mixture was adjusted to a pH of about 4 with a small amount of para-toluene-sulfonic acid and thereafter heated for 8 hours at 50° C. by intercepting the light. The resulting solution was neutralized with a small amount of aqueous ammonia and precipitated in ethanol. The precipitate was dissolved in water and reprecipitated in ethanol. This operation was repeated several times for purification. The resulting solution was freeze-dried to obtain a bulky substance of yellow color. As a result of the reduction-titration with an aqueous solution of titanium trichloride, the rate of reaction was found to be 87.5% to the methylol group of the high molecular substance.

This high molecular substance was a fluorescent high molecular substance having the same optical characteristics as those of riboflavin, i.e. having the maximum absorption at 532 m$\mu$ and emitting green fluorescence. Also, it was found that, because of the bond between the riboflavin portion and the high molecule substrate being a semi-acetalic ether bond, this high molecular substance gradually decomposes in an acidic medium to release the riboflavin, and that, therefore, there is a possibility that this substance, when administered as a medicine, will turn into durable vitamin $B_2$.

Example 4

1 part of 4,4'-dihydroxybenzophenone was added to 5 parts of a 25% tetrahydrofuran solution of the N-hydroxymethyl acrylamide-butyl acrylate-methyl methacrylate (5:10:10 weight ratio) three-component copolymer obtained in Example 1. The mixture was then acidified with a small amount of oxalic acid and thereafter heated for 8 hours at 50° C. The resulting solution was precipitated in water, and the precipitate was dissolved in tetrahydrofuran and reprecipitated in water. This operation was repeated to obtain a purified high molecular substance, which completely absorbed the ultraviolet light in the region below 350 m$\mu$ and were effective as an ultraviolet absorber.

The same operation was also applicable to ultraviolet absorbers containing a phenol nucleus such as 2,2'-dihydroxy - 4,4' - dimethoxybenzophenone, 7-hydroxycoumarin (umbelliferone), esculin, etc. to obtain the same effect.

What is claimed is:

1. A phototropic polymer comprising a polymer chain of N-hydroxymethyl(meth)acrylamide having pendant aminomethyl groups and having pendant thionine groups bonded to said pendant aminomethyl groups.

2. A process for the production of a phototropic high molecular weight polymer comprising reacting thionine with an N-hydroxymethyl group of a polymer of an N-hydroxymethyl(meth)acrylamide in a dehydrative condensation reaction to join said thionine to said polymer.

3. A process as defined in claim 2 wherein said polymer of an N-hydroxymethyl(meth)acrylamide is a copolymer of an N-hydroxymethyl(meth)acrylamide with at least one monomer selected from the group consisting of (meth)acrylamide, (meth)acrylic ester, (meth)acrylic acid, (meth)acrylic salt, styrene and vinyl acetate.

References Cited

UNITED STATES PATENTS

| 2,850,445 | 9/1958 | Oster | 204—159.23 |
|---|---|---|---|
| 3,138,460 | 6/1964 | Levinos | 204—159.23 |
| 2,976,259 | 3/1961 | Hardy | 252—300 |
| 3,467,642 | 9/1969 | Horiguchi | 260—41 C |

MORRIS LIEBMAN, Primary Examiner

P. R. MICHL, Assistant Examiner

U.S. Cl. X.R.

252—300, 301.2 R